US009237355B2

(12) United States Patent
Chien et al.

(10) Patent No.: US 9,237,355 B2
(45) Date of Patent: Jan. 12, 2016

(54) ADAPTIVE MOTION RESOLUTION FOR VIDEO CODING

(75) Inventors: Wei-Jung Chien, San Diego, CA (US); Marta Karczewicz, San Diego, CA (US); Peisong Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 576 days.

(21) Appl. No.: 12/945,170

(22) Filed: Nov. 12, 2010

(65) Prior Publication Data

US 2011/0206125 A1  Aug. 25, 2011

Related U.S. Application Data

(60) Provisional application No. 61/306,388, filed on Feb. 19, 2010, provisional application No. 61/323,221, filed on Apr. 12, 2010, provisional application No. 61/376,170, filed on Aug. 23, 2010.

(51) Int. Cl.
*H04N 11/02* (2006.01)
*H04N 19/58* (2014.01)
(Continued)

(52) U.S. Cl.
CPC ............. *H04N 19/58* (2014.11); *H04N 19/102* (2014.11); *H04N 19/147* (2014.11);
(Continued)

(58) Field of Classification Search
CPC .......... H04N 7/26808; H04N 7/26881; H04N 19/00739; H04N 19/0063
USPC .................................................... 375/240.16
See application file for complete search history.

(56) References Cited

U.S. PATENT DOCUMENTS 5,737,022 A    4/1998  Yamaguchi et al.
6,968,008 B1  11/2005  Ribas-Corbera et al.
(Continued)

FOREIGN PATENT DOCUMENTS

CN        1206993 A    2/1999
CN        1545321 A   11/2004
(Continued)

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
(Continued)

*Primary Examiner* — Andy Rao
*Assistant Examiner* — Obafemi Sosanya
(74) *Attorney, Agent, or Firm* — Todd E. Marlette

(57) ABSTRACT

A video encoder may encode video data by adaptively selecting between one-eighth-pixel and one-quarter-pixel precision motion vectors, and signal the selected precision. In one example, an apparatus includes a video encoder to encode a block of video data using a one-eighth-pixel precision motion vector when use of the one-eighth-pixel precision motion vector is determined to be preferable for the block over a one-quarter-pixel precision motion vector, and to generate a signal value indicative of the use of the one-eighth-pixel precision motion vector for the block, and an output interface to output the encoded block and the signal value. A video decoder may be configured to receive the signal value and the encoded block, analyze the signal value to determine whether the block was encoded using one-eighth-pixel precision or one-quarter-pixel precision, and decode the block based on the determination.

38 Claims, 7 Drawing Sheets

(51) Int. Cl.
  *H04N 19/52*   (2014.01)
  *H04N 19/176*  (2014.01)
  *H04N 19/147*  (2014.01)
  *H04N 19/172*  (2014.01)
  *H04N 19/46*   (2014.01)
  *H04N 19/102*  (2014.01)
  *H04N 19/61*   (2014.01)
  *H04N 19/523*  (2014.01)

(52) U.S. Cl.
  CPC .......... *H04N 19/172* (2014.11); *H04N 19/176* (2014.11); *H04N 19/46* (2014.11); *H04N 19/52* (2014.11); *H04N 19/523* (2014.11); *H04N 19/61* (2014.11)

(56) References Cited

U.S. PATENT DOCUMENTS

| | | | |
|---|---|---|---|
| 7,599,438 B2 | 10/2009 | Holcomb et al. | |
| 7,728,878 B2 | 6/2010 | Yea et al. | |
| 8,175,159 B2 * | 5/2012 | Suzuki ..................... | 375/240.16 |
| 2005/0243921 A1 | 11/2005 | Au et al. | |
| 2006/0133507 A1 | 6/2006 | Lim et al. | |
| 2007/0019724 A1 | 1/2007 | Tourapis et al. | |
| 2007/0127572 A1 | 6/2007 | Sasai et al. | |
| 2008/0084930 A1 | 4/2008 | Sekiguchi et al. | |
| 2008/0253459 A1 | 10/2008 | Ugur et al. | |
| 2008/0267289 A1 | 10/2008 | Yu et al. | |
| 2008/0310511 A1 | 12/2008 | Suzuki | |
| 2009/0092189 A1* | 4/2009 | Tsuchiya et al. ......... | 375/240.16 |
| 2009/0244299 A1* | 10/2009 | Fukunishi .................. | 348/208.4 |
| 2009/0257668 A1 | 10/2009 | Ye et al. | |
| 2009/0274215 A1 | 11/2009 | Metsugi | |
| 2010/0104020 A1 | 4/2010 | Ju | |
| 2010/0226434 A1 | 9/2010 | Lee et al. | |
| 2011/0032991 A1 | 2/2011 | Sekiguchi et al. | |
| 2012/0051431 A1 | 3/2012 | Chien et al. | |
| 2012/0057632 A1 | 3/2012 | Sato | |
| 2012/0093226 A1 | 4/2012 | Chien et al. | |
| 2012/0201293 A1* | 8/2012 | Guo et al. ................. | 375/240.02 |

FOREIGN PATENT DOCUMENTS

| | | | |
|---|---|---|---|
| CN | 1627825 A | | 6/2005 |
| CN | 1245031 C | | 3/2006 |
| CN | 1787641 A | | 6/2006 |
| CN | 101043621 A | | 9/2007 |
| CN | 101631245 A | | 1/2010 |
| EP | 1469682 A1 | | 10/2004 |
| EP | 1962514 A1 | | 8/2008 |
| JP | 2003319400 A | | 11/2003 |
| JP | 2004007337 A | | 1/2004 |
| JP | 2004186839 A | | 7/2004 |
| JP | 2009171608 A | | 7/2009 |
| JP | 2010016453 A | | 1/2010 |
| KR | 20030096504 A | | 12/2003 |
| WO | 03063503 A1 | | 7/2003 |
| WO | WO-2005076630 A1 | | 8/2005 |
| WO | WO2005104559 A1 | | 11/2005 |
| WO | WO2008122956 A2 | | 10/2008 |
| WO | WO-2009088038 A1 | | 7/2009 |
| WO | 2010101064 A1 | | 9/2010 |

OTHER PUBLICATIONS

Anonymous: "Text of ISO/IEC IS 14496-10:201X (6th edition)", 91 MPEG Meeting; Jan. 18, 2001-Jan. 22, 2010; Kyoto; (Motion Picture Expertgroup OR ISO/IEC JTC1/SC29/WG11), No. N11084, Apr. 16, 2010, pp. 1-110, XP002662630, ISSN: 0000-0030.

Bjontegaard et al., "H.26L Core Experiment on Adaptive Motion Accuracy (AMA( for 1/2, 1/4, and 1/8 Sample Accuracy Motion Compensation," Document Q15-J-09, ITU Study Group 16—Video Coding Experts Group—ISO/IEC MPEG & ITU-T VCEG(ISO/IEC. JTC1/SC29/WG11 and ITU-T SG16 Q6), Tenth Meeting. Osaka, JP, Mar. 2, 2000, 9 PP.

Gisle Bjontegaard et al: "H.26L Core Experiment on Adaptive Motion Accuracy (AMA) for 1/2, 1/4, and 1/8 Sample Accuracy Motion Compensation", ITU Study Group 16—Video Coding Experts Group—ISO/IEC MPEG & ITU-T VCEG(ISO/IEC JTC1/SC29/WG11 and ITU-T SG16 Q6), XX, XX, No. q15j09, Mar. 6, 2000, XP030003040.

International Search Report and Written Opinion—PCT/US2011/025113—ISA/EPO—Jun. 17, 2011.

International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.

Karczewicz, et al., "Video Coding Technology Proposal by Qualcomm Inc." (JCTVC-A121) Joint Collaborative Team on Video Coding (JCT-VC) of ITU-T SG16 WP3 and ISO/IECJTC1/SC29/WG11, 1st Meeting [Online] Apr. 15-23, 2010, pp. 1-24.

Lim et al., "Description of video coding technology proposal by SK telecom, Sejong Univ. and Sungkyunkwan Univ.," Document: JCTVC-A113, Dresden, DE, Apr. 15-23, 2010, 41 pp.

McCann, et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

Thomas Wedi et al: "1/8-pel motion vector resolution for H.26L", ITU Study Group 16—Video Coding Experts Group ISO/IEC MPEG & ITU-T VCEG (ISO/IEC JTC1/SC29/WG11 and ITU-T SG16 Q6), XX, XX, No. q15k21, Aug. 15, 2000, XP030003114.

U.S. Appl. No. 13/172,496 to Chien et al., entitled "Motion Direction Based Adaptive Motion Vector Resolution Signaling for Video Coding," filed Jun. 29, 2011.

U.S. Appl. No. 13/247,785, filed Sep. 28, 2011, entitled "Adaptive Motion Vector Resolution Signaling for Video Coding," Chien et al.

Marpe, D., et al., "The H264/MPEG4 Advanced Video Coding Standard and its Applications," Standards Report, IEEE Communications Magazine, Aug. 2006, pp. 134-143.

Taiwan Search Report—TW100105512—TIPO—May 23, 2014.

Amonou, I., et al., "Description of video coding technology proposal by France Telecom, NTT, NTT DOCOMO, Panasonic and Technicolor," ITU-T SG16 WP3 and ISOIIEC JTCIISC29NVG11, Document JCTVC-A114, Dresden, DE, Apr. 15-23, 2010, 42 pp.

Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pp.

Bross, et al., "High efficiency video coding (HEVC) text specification draft 8," Joint Collaborative Team on Video Coding (JCT-VC) of ITU-T SG16 WP3 and ISP/IEC JTC1/SC29/WG11 10th Meeting: Stockholm, SE, Jul. 11-20, 2012, JCTVC-J1003_d7, pp. 261.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Nakagawa: Context-based MV coding with 2-Dimensional VLC, 3. JVT Meeting; 60. MPEG Meeting; Jun. 5, 2002-Oct. 5, 2002; FAI RFAX, US; (Joint Video Team of ISO/IEC JTCI/SC29/WGII and ITU-T SG. 16 ), No. JVT-C097, May 10, 2002, XP030005205, ISSN: 0000-0442.

Wiegand, T., et al., "WD2: Working Draft 2 of High-Efficiency Video Coding", 20110128, No. JCTVC-D503, Jan. 28, 2011,

(56) References Cited

OTHER PUBLICATIONS

XP002679642, Retrieved from the Internet: URL: http://wftp3.itu.int/av-arch/jctvc-site/2011_01_D_Daegu/ [retrieved on Jul. 11, 2012].

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand, T., et al., "WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.

Said, "Introduction to Arithmetic Coding—Theory and Practice," Imaging Systems Laboratory, HP Laboratories, Palo Alto, Apr. 21, 2004, 67 pp.

Ostermann et al., "Motion compensated prediction with 1/8-pel displacement vector resolution," ITU-Telecommunications Standardization Sector, 30th meeting: Hangzhou, China, Oct. 23-27, 2006, 7 pp.

Karczewicz et al., "Single Pass Encoding using Switched Interpolation Filters with Offset," ITU-Telecommunications Standardization Sector, 36th meeting: San Diego, CA, Oct. 8-10, 2008.

Chen et al., "Prediction based Directional Refinement (PDR) algorithm for Fractional Pixel Motion Search Strategy," Joint Video Team (JVT) of ISO/IEC MPEG & ITU-T VCEG, 4th Meeting: Klagenfurt, Austria, Jul. 22-26, 2002, 12 pp.

ITU-T H.265, Series H: Audiovisual and Multimedia Systems, Infrastructure of audiovisual services—Coding of moving video, High efficiency video coding, The International Telecommunication Union, Apr. 2013, 317 pages.

Wedi T, "Advanced Motion Compensated Prediction Methods", [online], Oct. 29, 2004, ITU-T Video Coding Experts Group (ITU-T SG16 Q.6), Document: VCEG-X10, [Searched on Oct. 30, 2013], Internet , 8 pages.

Wedi T. et al., "Motion- and Aliasing-Compensated Prediction for Hybrid Video Coding", IEEE Transactions on Circuits and Systems for Video Technology, vol. 13, Issue 7, Jul. 2003, pp. 577-586.

Wedi T., "1/8-pel Motion Vector Resolution for Interlaced Video Coding", Joint Video Team (JVT) of ISO/IEC MPEG & ITU-T VCEG (ISO/IEC JTC1/SC29/WG11 and ITU-T SG16 Q.6), JVT-B066, VCEG, 2002, 7 pages.

\* cited by examiner

ADAPTIVE MOTION RESOLUTION FOR VIDEO CODING

CLAIM OF PRIORITY UNDER 35 U.S.C. §119

This application claims the benefit of U.S. Provisional Application No. 61/306,388, filed Feb. 19, 2010, U.S. Provisional Application No. 61/323,221, filed Apr. 12, 2010, and U.S. Provisional Application No. 61/376,170, filed Aug. 23, 2010, which are hereby incorporated by reference in their respective entireties.

REFERENCE TO CO-PENDING APPLICATION FOR PATENT

The present application for patent is related to the following U.S. Provisional Patent Application No. 61/376,808, filed Aug. 25, 2010, assigned to the assignee hereof and expressly incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to store, transmit and receive digital video information more efficiently.

Video compression techniques perform spatial prediction and/or temporal prediction to reduce or remove redundancy inherent in video sequences. For block-based video coding, a video frame or slice may be partitioned into blocks, such as macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

SUMMARY

In general, this disclosure describes techniques for supporting adaptive motion resolution during video coding, e.g., adaptive resolution selection for motion estimation and motion compensation. For example, a video encoder may be configured to select either eighth pixel precision or quarter pixel precision when encoding a block of video data. When the video encoder selects eighth pixel precision for a block, the video encoder may encode a motion vector for the block by quantizing the motion vector to the same precision as a reference motion vector. The video encoder may signal selection of eighth pixel precision for the block using the techniques of this disclosure. In some examples, such a signal may be interpreted within a particular context, where the context may relate to whether neighboring blocks were encoded using eighth pixel precision, quarter pixel precision, or a combination thereof.

In one example, a method includes encoding, with a video encoder, a block of video data using a one-eighth-pixel precision motion vector when use of the one-eighth-pixel precision motion vector is determined to be preferable for the block over a one-quarter-pixel precision motion vector, generating a signal value indicative of the use of the one-eighth-pixel precision motion vector for the block, and outputting the encoded block and the signal value.

In another example, an apparatus includes a video encoder to encode a block of video data using a one-eighth-pixel precision motion vector when use of the one-eighth-pixel precision motion vector is determined to be preferable for the block over a one-quarter-pixel precision motion vector, and to generate a signal value indicative of the use of the one-eighth-pixel precision motion vector for the block, and an output interface to output the encoded block and the signal value.

In another example, an apparatus includes means for encoding a block of video data using a one-eighth-pixel precision motion vector when use of the one-eighth-pixel precision motion vector is determined to be preferable for the block over a one-quarter-pixel precision motion vector, means for generating a signal value indicative of the use of the one-eighth-pixel precision motion vector for the block, and means for outputting the encoded block and the signal value.

In another example, a computer-readable medium, such as a computer-readable storage medium, contains, e.g., is encoded with, instructions that, when executed, cause a programmable processor to encode a block of video data using a one-eighth-pixel precision motion vector when use of the one-eighth-pixel precision motion vector is determined to be preferable for the block over a one-quarter-pixel precision motion vector, generate a signal value indicative of the use of the one-eighth-pixel precision motion vector for the block, and output the encoded block and the signal value.

In another example, a method includes receiving, with a video decoder, an encoded block of video data and a signal value indicating that the encoded block of video data was encoded using a one-eighth-pixel precision motion vector, analyzing the signal value to determine that the block of video data was encoded using the one-eighth-pixel precision motion vector, and decoding the block of video data using the one-eighth-pixel precision motion vector based on the signal value.

In another example, an apparatus includes an input interface to receive an encoded block of video data and a signal value indicating that the encoded block of video data was encoded using a one-eighth-pixel precision motion vector, and a video decoder to analyze the signal value to determine that the block of video data was encoded using the one-eighth-pixel precision motion vector, and to decode the block of video data using the one-eighth-pixel precision motion vector based on the signal value.

In another example, an apparatus includes means for receiving an encoded block of video data and a signal value indicating that the encoded block of video data was encoded using a one-eighth-pixel precision motion vector, means for analyzing the signal value to determine that the block of video data was encoded using the one-eighth-pixel precision motion vector, and means for decoding the block of video data using the one-eighth-pixel precision motion vector based on the signal value.

In another example, a computer-readable storage medium comprises instructions that, when executed, cause a processor to receive an encoded block of video data and a signal value indicating that the encoded block of video data was encoded using a one-eighth-pixel precision motion vector, analyze the signal value to determine that the block of video data was encoded using the one-eighth-pixel precision motion vector, and decode the block of video data using the one-eighth-pixel precision motion vector based on the signal value.

The details of one or more examples are set forth in the accompanying drawings and the description below. Other features, objects, and advantages will be apparent from the description and drawings, and from the claims.

DETAILED DESCRIPTION

Figure 1:
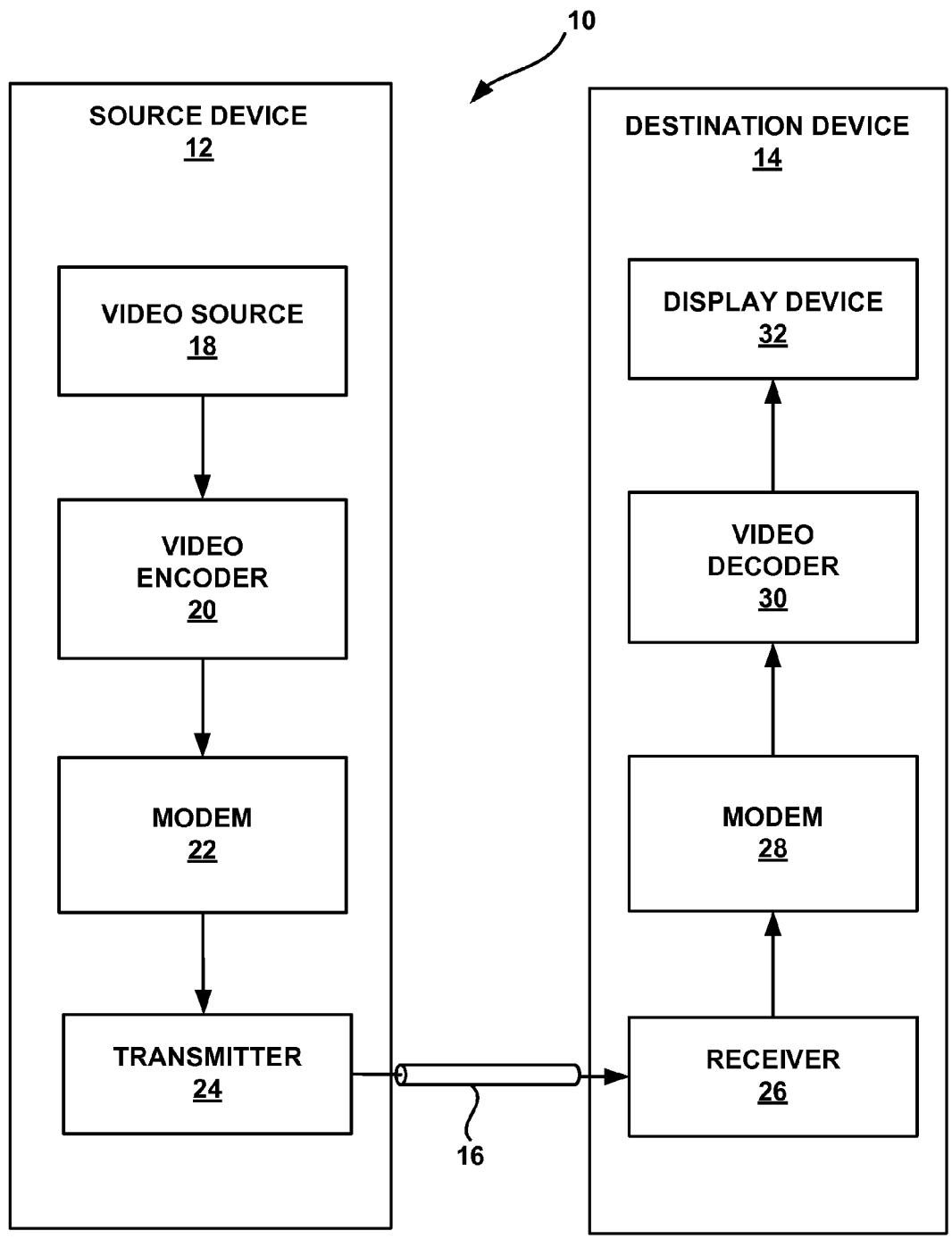
FIG. 1 is a block diagram illustrating an example video encoding and decoding system that may utilize either one-eighth-pixel or one-quarter-pixel precision for motion vectors.

In general, this disclosure describes techniques for supporting the use of motion vectors having one-eighth-pixel (that is, one-eighth of a pixel) precision. The term "eighth-pixel" precision in this disclosure is intended to refer to precision of one-eighth ($1/8^{th}$) of a pixel, e.g., one of: the full pixel position (0/8), one-eighth of a pixel (1/8), two-eighths of a pixel (2/8, also one-quarter of a pixel), three-eighths of a pixel (3/8), four-eighths of a pixel (4/8, also one-half of a pixel), five-eighths of a pixel (5/8), six-eighths of a pixel (6/8, also three-quarters of a pixel), or seven-eighths of a pixel (7/8).

Conventional H.264 encoders and decoders support motion vectors having one-quarter-pixel precision. In some instances, one-eighth-pixel precision may provide certain advantages over one-quarter-pixel precision. However, encoding every motion vector to one-eighth-pixel precision may require too many coding bits that may outweigh the benefits of one-eighth-pixel precision motion vectors. The techniques of this disclosure include using one-eighth-pixel precision motion vectors when appropriate, otherwise using standard one-quarter-pixel precision motion vectors, and signaling the use of one-eighth-pixel precision motion vectors when they are used so that a decoder may determine the precision used by the encoder for particular blocks.

A video encoder may encode a motion vector for a block relative to a "predictor" motion vector, alternatively referred to as a motion predictor. The motion predictor for a given block may be selected as the median of motion vectors for blocks neighboring the block for which the motion vector is being encoded. In general, to encode a motion vector, a video encoder calculates the difference between the motion vector and the predictor. By introducing one-eighth-pixel precision motion vectors, the motion vector and the predictor may have different precisions. To properly calculate the difference between the motion vector to be encoded and its motion predictor, the video encoder may ensure that the motion vector and the motion predictor have the same precision.

This disclosure provides various example methods for encoding a motion vector relative to a motion predictor. In one example, the video encoder may be configured to convert all motion vectors to one resolution for encoding. That is, to calculate the difference between a motion vector to be encoded and a predictor, the encoder may convert the motion vector and motion predictor to a global resolution. For example, the encoder may convert all motion vectors to one-quarter-pixel precision or may convert all motion vectors to one-eighth-pixel precision, for the purpose of calculating the difference. In another example, the video encoder may quantize the motion predictor to the same resolution as the motion vector to be encoded.

This disclosure also provides techniques for signaling whether one-quarter- or one-eighth-pixel precision is used for a particular motion vector. In some examples, a video encoder may be configured to add a one-bit flag for every motion vector, such that the value of the flag indicates the use of either one-eighth-pixel or one-quarter-pixel precision for the motion vector. This disclosure proposes various other methods to signal the presence of a one-eighth-pixel precision motion vector as well.

In one example, the video encoder may use a one-bit flag to signal precision for each motion vector, but may include the flag as part of a redesigned reference frame index value, rather than with macroblock data itself. The reference frame index typically corresponds to a variable length code (VLC). This disclosure proposes designing the variable length codes for the reference frame index value such that the one bit flag indicative of quarter- or one-eighth-pixel precision may be included in the variable length code. For example, the video encoder may be configured to execute a context-adaptive variable length coding (CAVLC) algorithm that may take account of potential reference frame index values, as well as the likelihood that a motion vector pointing to a block of the reference frame will use one-eighth-pixel precision.

In another example, motion resolution adaptation (that is, the ability to use either quarter- or one-eighth-pixel precision) may occur only when the latest reference frames (e.g., having ref_idx 0) are used for reference when encoding a frame. Thus, in this example, when a block is encoded relative to a reference frame other than the latest reference frame (that is, the most recent reference frame in a list of reference frame), the motion vector for the block can only have one-quarter-pixel resolution; otherwise, the precision may be signaled, e.g., by a one-bit flag, or may be presumed to have one-eighth-pixel precision as a default.

This disclosure further provides techniques for varying the indication of whether a motion vector for a block uses one-eighth-pixel precision or one-quarter-pixel precision based on a context for the block. The context may correspond to whether neighboring blocks include motion vectors with one-eighth-pixel or one-quarter-pixel precision. The neighboring blocks may correspond to a block above the current block and a block to the left of the current block. The contexts may correspond to when motion vectors for the neighboring blocks all use one-eighth-pixel precision, when motion vectors for the neighboring blocks all use one-quarter-pixel precision, and when motion vectors for the neighboring blocks use a mixture of one-eighth-pixel and one-quarter-pixel precision.

The above situations (all one-eighth precision, all one-quarter precision, or mixed precision) may be referred to as encoding contexts for the current block to be coded. In recognition that a current block may benefit from using motion vectors of the same precision as motion vectors for neighboring blocks, this disclosure provides techniques for using different codes (e.g., variable length codes) in each encoding context for the current block. The codes of a particular encoding context may be designed such that a more likely precision in the encoding context is indicated using a relatively shorter code, while a less likely precision is indicated using a relatively longer code.

FIG. 1 is a block diagram illustrating an example video encoding and decoding system 10 that may utilize either one-eighth-pixel or one-quarter-pixel precision for motion vectors. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radio-telephones, or any wireless devices that can communicate video information over a communication channel 16, in which case communication channel 16 is wireless. The techniques of this disclosure, however, which concern selection between one-eighth-pixel and one-quarter-pixel precision for motion vectors, signaling this selection, and encoding the resulting motion vectors, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for selection between one-eighth-pixel and one-quarter-pixel precision for motion vectors, signaling this selection, and encoding the resulting motion vectors. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for selection between one-eighth-pixel and one-quarter-pixel precision for motion vectors, signaling this selection, and encoding the resulting motion vectors may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to select between one-eighth-pixel and one-quarter-pixel precision for motion vectors, signal this selection, and encode the resulting motion vectors. The information communicated over channel 16 may include syntax information defined by video encoder 20, which is also used by video decoder 30, that includes syntax elements that describe characteristics and/or processing of macroblocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a macroblock, a partition of a macroblock, or a collection of blocks or macroblocks. The video blocks may have fixed or varying sizes, and may differ in size according to a specified coding standard. Each video frame may include a plurality of slices. Each slice may include a plurality of macroblocks, which may be arranged into partitions, also referred to as sub-blocks.

Many popular video coding standards, such as H.263, H.264, H.265, MPEG-2, and MPEG-4, H.264/AVC (advanced video coding), utilize motion-compensated prediction techniques. An image or a frame of a video may be partitioned into multiple macroblocks and each macroblock can be further partitioned. Macroblocks in an I-frame may be encoded by using the prediction from spatial neighbors (that is, other blocks of the I-frame). Macroblocks in a P- or B-frame may be encoded by using either the prediction from their spatial neighbors (spatial prediction or intra-mode encoding) or areas in other frames (temporal prediction or inter-mode encoding). Video coding standards define syntax elements to represent coding information. For example, for every macroblock, H.264 defines an mb_type value that represents the manner in which a macroblock is partitioned and the method of prediction (spatial or temporal).

Video encoder 20 may provide individual motion vectors for each partition of a macroblock. For example, if video encoder 20 elects to use the full macroblock as a single partition, video encoder 20 may provide one motion vector for the macroblock. As another example, if video encoder 20 elects to partition a 16×16 pixel macroblock into four 8×8 partitions, video encoder 20 may provide four motion vectors, one for each partition. For each partition (or sub-macroblock unit), video encoder 20 may provide an mvd value and a ref_idx value to represent motion vector information. The mvd (motion vector difference) value may represent an encoded motion vector for the partition, relative to a motion predictor. The ref_idx (reference index) value may represent an index into a list of potential reference pictures, that is, reference frames. As an example, H.264 provides two lists of reference pictures: list 0 and list 1. The ref_idx value may identify a picture in one of the two lists. Video encoder 20 may also provide information indicative of the list to which the ref_idx value relates.

As an example, the ITU-T H.264 standard supports intra prediction in various block partition sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

The H.264 standard supports motion vectors having one-quarter-pixel precision. That is, encoders, decoders, and encoders/decoders (CODECs) that support H.264 may use motion vectors that point to either a full pixel position or one of fifteen fractional pixel positions. Values for fractional pixel positions may be determined using adaptive interpolation filters or fixed interpolation filters. In some examples, H.264-compliant devices may use 6-tap Wiener filters having coefficients [1, −5, 20, 20, −5, 1] to calculate values for the half-pixel positions, then use bilinear filters to determine values for the remaining one-quarter-pixel positions. Adaptive interpolation filters may be used during an encoding process to adaptively define interpolation filter coefficients, and thus the filter coefficients may change over time when performing adaptive interpolation filters.

In accordance with the techniques of this disclosure, video encoder 20 may be configured to select between one-eighth-pixel precision and one-quarter-pixel precision when calculating motion vectors for blocks of video data. Video encoder 20 may perform this selection during a motion estimation process. Video encoder 20 may evaluate various criteria when determining whether to select eighth- or one-quarter-pixel precision for a motion vector. For example, video encoder 20 may be configured to perform two encoding passes: a first pass using one-quarter-pixel precision and a second pass using one-eighth-pixel precision. Video encoder 20 may utilize a rate-distortion optimization process to select between one-quarter-pixel precision and one-eighth-pixel precision. That is, video encoder 20 may then determine whether the first encoding pass or the second encoding pass provides a better rate-distortion value, one-eighth-pixel one-quarter-pixel Video encoder 20 may calculate the cost of using one-eighth-pixel or one-quarter-pixel precision as a weighted combination of error and bit-rate, and select the precision that provides the lower cost. In some examples, video encoder 20 may perform a rate-distortion optimization during the motion vector search, rather than performing two full encoding passes.

When video encoder 20 selects one-eighth-pixel precision for a particular block of video data, video encoder 20 may be configured to interpolate values for the one-eighth-pixel positions. In some examples, video encoder 20 may first interpolate values for half-pixel positions, then interpolate values for one-quarter-pixel positions, and then interpolate values for one-eighth-pixel positions. Video encoder 20 may use different types of interpolation filters for the half-pixel, one-quarter-pixel, and one-eighth-pixel positions. For example, video encoder 20 may use adaptive interpolation filters and/or fixed interpolation filters, such as Wiener filters or bilinear filters, for the various fractional pixel positions.

When video encoder 20 selects one-eighth-pixel precision for a particular block of video data, video encoder 20 may be configured to signal the use of one-eighth-pixel precision for that block. By signaling the use of one-eighth-pixel precision or one-quarter-pixel precision, a decoder, such as video decoder 30, may be able to determine whether the motion vector uses one-eighth-pixel or one-quarter-pixel precision, in order to properly utilize the motion vector. In some examples, video encoder 20 may be configured to add a one-bit flag to all motion vectors indicative of whether the corresponding motion vector uses one-eighth-pixel or one-quarter-pixel precision. For example, video encoder 20 may set the flag (e.g., set the value of the flag to '1') when one-eighth-pixel precision is used for the motion vector, and clear the flag (e.g., set the value of the flag to '0') when one-eighth-pixel precision is not used for the motion vector.

In another example, video encoder 20 may be configured to add a one-bit flag to a macroblock that indicates whether all motion vectors for the macroblock use one-eighth-pixel or one-quarter-pixel precision. A macroblock may be associated with one or more motion vectors. For example, each partition of a macroblock may have its own respective motion vector. Accordingly, video encoder 20 may signal the use of one-eighth-pixel or one-quarter-pixel precision at the macroblock layer, e.g., in a macroblock header. That is, the one bit flag for a macroblock may indicate that each of the motion vectors of the macroblock use either one-eighth-pixel or one-quarter-pixel precision, such that each of the motion vectors for a macroblock use the same precision. In some examples, video encoder 20 may encode a full frame using motion vectors having the same precision, e.g., one frame using motion vectors having one-quarter-pixel precision, and another frame using motion vectors having one-eighth-pixel precision. Thus, video encoder 20 may utilize frame-level signaling to signal whether motion vectors for a frame have one-quarter-pixel precision or one-eighth-pixel precision.

As another example, video encoder 20 may combine the signaling of whether a motion vector uses one-quarter-pixel or one-eighth-pixel precision with a reference frame index (ref_idx) value for the motion vector. The potential reference frame index values may be redesigned, e.g., by executing a context-adaptive variable length coding (CAVLC) algorithm, to accommodate this extra information. Video encoder 20 may provide a unit or module that implements the CAVLC algorithm with statistics indicating a likelihood that a motion vector pointing to a particular reference frame would benefit from one-eighth-pixel precision over one-quarter-pixel precision, in order to design the reference frame index values. In this manner, a reference frame index value indicative of the most likely precision for a particular reference frame may have a relatively shorter length than a reference frame index value indicative of the less likely precision for the reference frame.

In some examples, video encoder 20 may further generate sets of potential codewords, each of the sets of codewords relating to various contexts for a block. The contexts may relate to whether neighboring blocks use one-eighth-pixel precision or one-quarter-pixel precision. In one example, the relevant neighboring blocks may correspond to a block above the current block and a block to the left of the current block. Accordingly, in some examples, video encoder 20 may select a code word for a reference frame index of a motion vector and indicate whether the motion vector is of one-eighth-pixel or one-quarter-pixel precision from one of four sets of codewords, corresponding to one of four encoding contexts.

The first context may be where motion vectors for both the above block and the left block use one-quarter-pixel precision. The second context may be where motion vectors for both the above block and the left block use one-eighth-pixel precision. The third context may be where a motion vector for the above block uses one-eighth-pixel precision and where a motion vector for the left block uses one-quarter-pixel precision. The fourth context may be where a motion vector for the above block uses one-quarter-pixel precision and where a motion vector for the left block uses one-eighth-pixel precision. There may be four sets of codewords for the reference frame index, each corresponding to one of the four contexts. Accordingly, video encoder 20 may choose the codeword for a reference frame index of a motion vector from the set corresponding to the context in which the block for the motion vector occurs.

Video encoder 20 may limit the selection of whether to use one-eighth-pixel precision motion vectors to the analysis of the latest reference frames. That is, video encoder 20 may only determine whether to use one-eighth-pixel or one-quarter-pixel precision when analyzing reference frames having a reference frame index value of zero in list 0 and list 1. Video encoder 20 may be configured to always use one-quarter-pixel precision for reference frames in lists 0 and 1 having non-zero reference frame index values. When analyzing reference frames having a reference frame index value of zero in either list 0 or list 1, video encoder 20 may be configured to analyze the criteria described above, or other criteria, to determine whether to use one-eighth-pixel or one-quarter-pixel precision motion vectors.

Moreover, video encoder 20 may be configured to signal the selection for motion vectors pointing to a portion of a reference frame having a reference frame index value equal to zero in list 0 or list 1. Likewise, video decoder 30 may be configured to assume that a motion vector having a reference frame index other than zero is of one-quarter-pixel precision, and to analyze a flag indicative of the use of one-eighth-pixel or one-quarter-pixel precision for motion vectors having a reference frame index value equal to zero. In some examples, video encoder 20 may be configured such that other particular frames, in addition to or in the alternative to the frame having a reference frame index value of zero, may be encoded using one-eighth-pixel precision.

Video encoder 20 may further be configured to encode the motion vector for a block relative to a motion predictor. The motion predictor may be selected as the mean of the motion vectors of neighboring blocks that have already been encoded. To encode the motion vector for a current block, video encoder 20 may calculate the difference between the motion vector and the motion predictor. In some examples, video encoder 20 may always encode motion vectors in a predetermined motion resolution. That is, video encoder 20 may always encode a motion vector in one-eighth-pixel or one-quarter-pixel precision. In some examples, video encoder 20 may quantize the motion predictor to the same motion resolution as the current motion vector.

Video encoder 20 may be configured to use a predetermined one of these methods, or another method, and video decoder 30 may likewise be configured to use the same method to decode encoded motion vectors. Alternatively, video encoder 20 may signal the prediction method used for encoding motion vectors in a sequence parameter set, a slice parameter set, or a picture parameter set, to take advantage of different motion vector encoding methods in a single bitstream.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Video encoder 20 may further send syntax data, such as block-based syntax data, frame-based syntax data, slice-based syntax data, and/or GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video decoder 30 may receive a bitstream including motion vectors encoded according to any of the techniques of this disclosure. Accordingly, video decoder 30 may be configured to interpret the encoded motion vector. For example, video decoder 30 may first analyze a sequence parameter set or slice parameter set to determine whether the encoded motion vector was encoded using a method that keeps all motion vectors in one motion resolution, or using a method where the motion predictor was quantized to the resolution of the motion vector. Video decoder 30 may then decode the motion vector relative to the motion predictor by determining the motion predictor and adding the value for the encoded motion vector to the motion predictor.

Video decoder 30 may also determine whether the motion vector uses one-eighth-pixel or one-quarter-pixel precision by analyzing a flag for the motion vector, which may be included with the motion vector itself or in a block, such as a macroblock, to which the motion vector corresponds. In some examples, video decoder 30 may presume that the motion vector has one-quarter-pixel precision, e.g., when the motion vector refers to a reference picture having a reference frame index value other than zero in list 0 or list 1. In some examples, video decoder 30 may determine the precision for the motion vector based on a reference frame index value, which may be identified in a list of potential reference frame index values according to a CAVLC code word for the reference frame index value. Moreover, video decoder 30 may determine the context in which the block for the motion vector occurs, where the context relates to whether motion vectors for neighboring blocks (e.g., above and to the left of the current block) use one-eighth-pixel or one-quarter-pixel precision. Video decoder 30 may then use the decoded motion vector to determine a prediction value for a current block, offset by a residual value for the current block.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
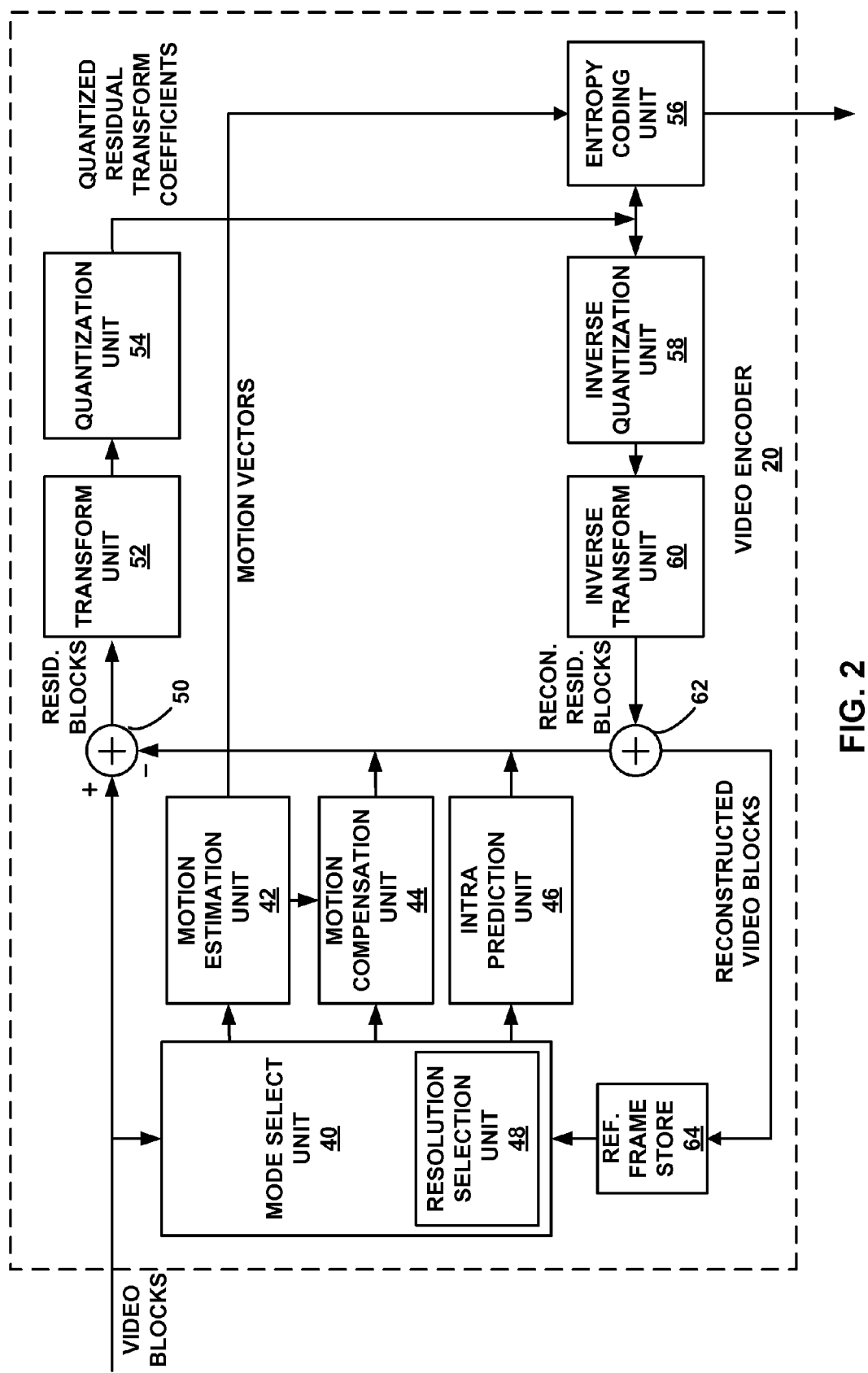
FIG. 2 is a block diagram illustrating an example of a video encoder that may implement techniques for selectively encoding blocks using either one-eighth-pixel precision or one-quarter-pixel precision.

FIG. 2 is a block diagram illustrating an example of video encoder 20 that may implement techniques for selectively encoding blocks using either one-eighth-pixel precision or one-quarter-pixel precision. Video encoder 20 may perform intra- and inter-coding of blocks within video frames, including macroblocks, or partitions or sub-partitions of macroblocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes. Although components for inter-mode encoding are depicted in FIG. 2, it should be understood that video encoder 20 may further include components for intra-mode encoding. However, such components are not illustrated for the sake of brevity and clarity.

As shown in FIG. 2, video encoder 20 receives a current video block within a video frame to be encoded. In the example of FIG. 2, video encoder 20 includes motion compensation unit 44, motion estimation unit 42, reference frame store 64, summer 50, transform unit 52, quantization unit 54, and entropy coding unit 56. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error results produced in each mode. When mode select unit 40 selects inter-mode encoding for a block, resolution selection unit 48 may select a resolution for a motion vector for the block. For example, resolution selection unit 48 may select one-eighth-pixel precision or one-quarter-pixel precision for a motion vector for the block. Resolution selection unit 48 may analyze various criteria for selecting a resolution for the motion vector of a block.

In some examples, resolution selection unit 48 may perform a resolution selection only for motion vectors that refer to a temporally most recent reference frame in a list of potential reference frames. When the reference frame is not the most recent frame in the list, resolution selection unit 48 may be configured to select one-quarter-pixel precision for the motion vector.

As an example, resolution selection unit 48 may be configured to compare an error difference between using a one-quarter-pixel precision motion vector to encode a block and using a one-eighth-pixel precision motion vector to encode the block. When the difference exceeds a threshold, resolution selection unit 48 may select the one-eighth-pixel precision motion vector for encoding the block. Resolution selection unit 48 may also evaluate rate-distortion information, analyze a bit budget, or analyze other factors to determine whether to use one-eighth-pixel precision or one-quarter-pixel precision for a motion vector when encoding a block during an inter-mode prediction process. After selecting one-eighth-pixel precision or one-quarter-pixel precision for a block to be inter-mode encoded, mode select unit may send a message (e.g., a signal) to motion estimation unit 42 indicative of the selected precision.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame in the selected precision by comparing the video block to video blocks of a reference frame in reference frame store 64. Motion estimation unit 42 or motion compensation unit 44 may calculate values for fractional pixel positions of a reference frame included in reference frame store 64. In some examples, summer 62 or another unit of video encoder 20 may calculate the fractional pixel position values for reconstructed blocks and then store the reconstructed blocks, with the calculated values for the fractional pixel positions, in reference frame store 64. Motion compensation unit 44 may also interpolate sub-integer pixels of the reference frame, e.g., an I-frame or a P-frame.

Motion estimation unit 42, motion compensation unit 44, mode select unit 40, or another unit of video encoder 20, may also signal the use of one-quarter-pixel precision or one-eighth-pixel precision for a motion vector used to encode a block. In some examples, motion estimation unit 42 may be configured to add a one-bit flag to all motion vectors indicative of whether the corresponding motion vector uses one-eighth-pixel or one-quarter-pixel precision. In another example, motion estimation unit 42 may be configured to add a one-bit flag to a macroblock that indicates whether all motion vectors for the macroblock use one-eighth-pixel or one-quarter-pixel precision.

As another example, motion estimation unit 42 may combine the signaling of whether a motion vector uses one-quarter-pixel or one-eighth-pixel precision with a reference frame index (ref_idx) value for the motion vector. The reference frame index value may identify both a reference frame stored in reference frame store 64 and indicate whether the motion vector is of one-eighth-pixel or quarter pixel precision. Motion estimation unit 42 may send an indication of the reference frame and precision to entropy coding unit 56, which may select a reference frame index value from a set of potential code words corresponding to an encoding context for the block being encoded. Motion estimation unit 42 may further send an indication of the encoding context for the block to entropy coding unit 56.

Motion estimation unit 42 may be configured to encode a motion vector relative to a motion predictor. Motion estimation unit 42 may select the motion predictor as the mean of the motion vectors of neighboring blocks that have already been encoded. To encode the motion vector for a current block, motion estimation unit 42 may calculate the difference between the motion vector and the motion predictor to form a motion vector difference value. In some examples, motion estimation unit 42 may always encode motion vectors in a predetermined motion resolution. That is, motion estimation unit 42 may always encode a motion vector in one-eighth-pixel or one-quarter-pixel precision. In some examples, motion estimation unit 42 may quantize the motion predictor to the same motion resolution as the motion vector to be encoded.

The ITU H.264 standard refers to a set of potential reference frames as a "list." Therefore, a set of reference frames stored in reference frame store 64 may correspond to a list of reference frames. Motion estimation unit 42 compares blocks of one or more reference frames from reference frame store 64 to a block to be encoded of a current frame, e.g., a P-frame or a B-frame. When the reference frames in reference frame store 64 include values for sub-integer pixels, a motion vector calculated by motion estimation unit 42 may refer to a sub-integer pixel location of a reference frame. Motion estimation unit 42 sends the calculated motion vector to entropy coding unit 56 and motion compensation unit 44. The reference frame block identified by a motion vector may be referred to as a predictive block. Motion compensation unit 44 calculates error values for the predictive block of the reference frame relative to the block being encoded.

Motion compensation unit 44 may calculate prediction data based on the predictive block. Video encoder 20 forms a residual video block by subtracting the prediction data from motion compensation unit 44 from the original video block being coded. Summer 50 represents the component or components that perform this subtraction operation. Transform unit 52 applies a transform, such as a discrete cosine transform (DCT) or a conceptually similar transform, to the residual block, producing a video block comprising residual transform coefficient values.

Transform unit 52 may perform other transforms, such as those defined by the H.264 standard, which are conceptually similar to DCT. Wavelet transforms, integer transforms, sub-band transforms or other types of transforms could also be used. In any case, transform unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring macroblocks.

In some cases, entropy coding unit 56 or another unit of video encoder 20 may be configured to perform other coding functions, in addition to entropy coding. For example, entropy coding unit 56 may be configured to determine the CBP values for the macroblocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block within a reference frame in a reference picture list. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values (e.g., for half-pixel positions, one-quarter-pixel positions, and/or one-eighth-pixel positions) for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-code a block in a subsequent video frame.

Figure 3:
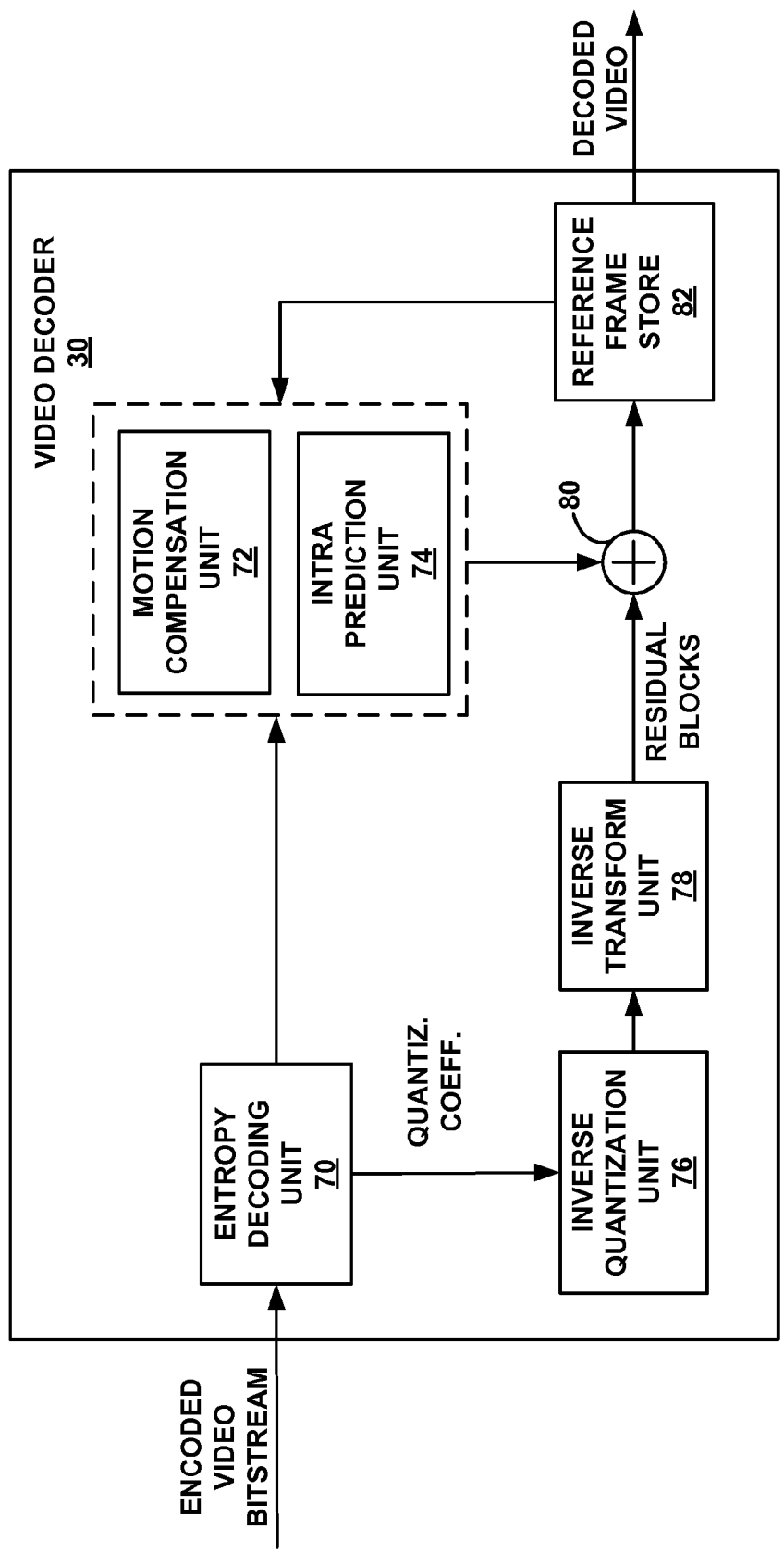
FIG. 3 is a block diagram illustrating an example of a video decoder, which decodes an encoded video sequence.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transformation unit 78, reference frame store 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

Motion compensation unit 72 may use motion vectors received in the bitstream to identify a prediction block in reference frames in reference frame store 82. In accordance with the techniques of this disclosure, the received motion vectors may have one-eighth-pixel or one-quarter-pixel precision. Motion compensation unit 72 may be configured to receive and analyze signal values included in the encoded bitstream that indicate whether a particular motion vector has one-eighth-pixel precision or one-quarter-pixel precision. As noted above, the signal values may correspond to flags included with the motion vectors, macroblock-layer flags that signal precision of motion vectors for all partitions of a macroblock, specially designed variable length codes that represent both a reference frame index value and whether the motion vector pointing to a portion of the reference frame corresponding to the reference frame index value has one-eighth-pixel precision or one-quarter-pixel precision, or other types of signaling values.

In the case that variable length codes signal precision for respective motion vectors, the variable length code for a particular motion vector may be included in a set of codes specific to an encoding context for the motion vector. To decode the motion vector, motion compensation unit 72 may be configured to determine an encoding context for an encoded block. The encoding context may correspond to whether motion vectors for neighboring blocks have one-eighth-pixel precision or one-quarter-pixel precision.

Motion vectors may also be encoded relative to a motion predictor for the block corresponding to the encoded motion vector. Motion compensation unit 72 may determine the motion predictor as the median of motion vectors of blocks neighboring the block to be decoded. After determining the motion predictor, motion compensation unit 72 may decode the encoded motion vector by extracting a motion vector difference value from the encoded video bitstream and adding the motion vector difference value to the motion predictor. In some examples, motion compensation unit 72 may quantize the motion predictor to the same resolution as the encoded motion vector. In some examples, motion compensation unit 72 may use the same precision for all encoded motion predictors. In still other examples, motion compensation unit 72 may be configured to use either of the above methods, and to determine which method to use by analyzing data included in a sequence parameter set, slice parameter set, or picture parameter set.

After decoding a motion vector, motion compensation unit 72 may extract the prediction block identified by the motion vector from a reference frame of reference frame store 82. If the motion vector points to a fractional pixel position, such as a half-pixel, one-quarter-pixel, or one-eighth-pixel position, motion compensation unit 72 may interpolate values for the fractional pixel positions. Motion compensation unit 72 may use adaptive interpolation filters or fixed interpolation filters to interpolate these values. Furthermore, motion compensation unit 72 may receive indicia of which filters to use, and in some cases coefficients for the filters, from a corresponding encoder via the received encoded video bitstream.

Intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by encoder 50 for each macroblock to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in syntax elements of the block. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of macroblocks used to encode frame(s) of the encoded video sequence, partition information that describes how each macroblock of a frame of the encoded video sequence is partitioned, modes indicating how each partition is encoded, one or more reference frames for each inter-encoded macroblock or partition, and other information to decode the encoded video sequence.

Summer 80 sums the residual blocks with the corresponding prediction blocks generated by motion compensation unit 72 or intra-prediction unit to form decoded blocks. If desired, a deblocking filter may also be applied to filter the decoded blocks in order to remove blockiness artifacts. The decoded video blocks are then stored in reference frame store 82, which provides reference blocks for subsequent motion compensation and also produces decoded video for presentation on a display device (such as display device 32 of FIG. 1).

Figure 4:
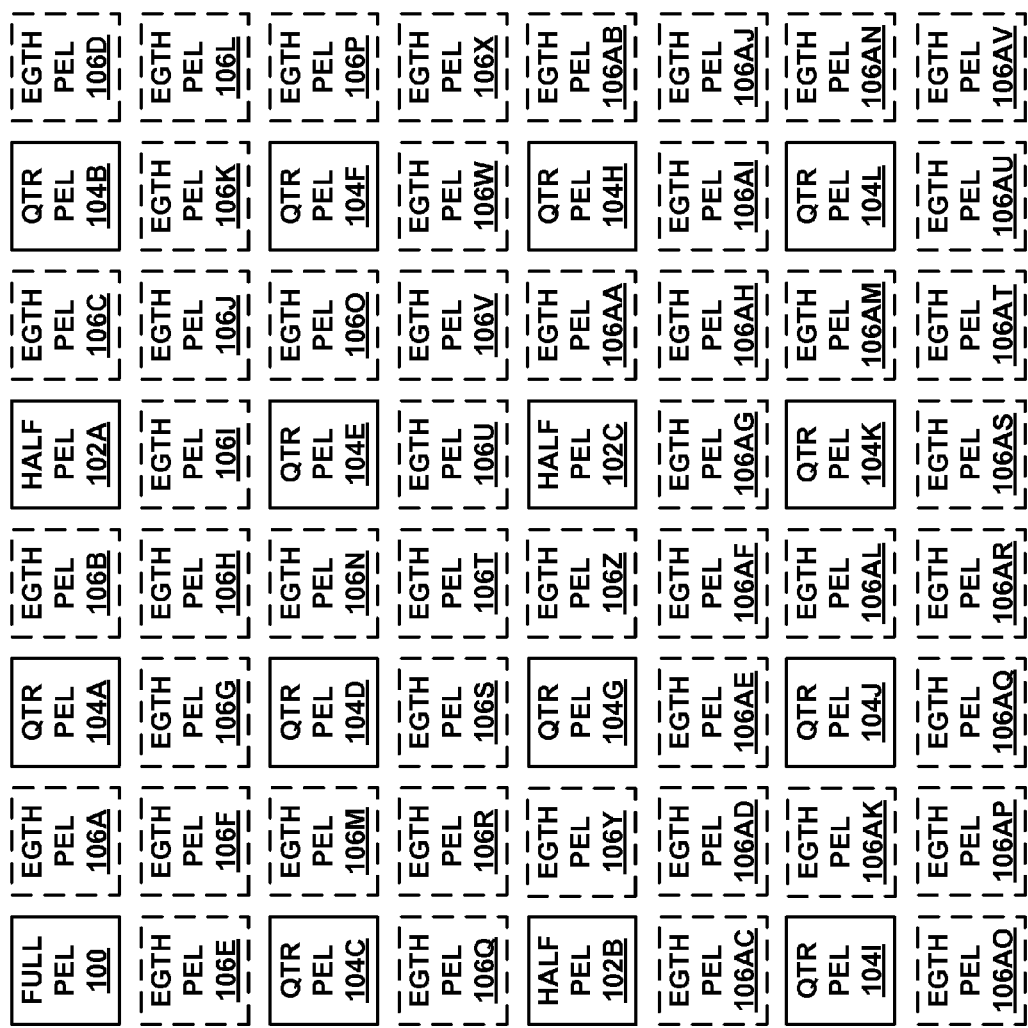
FIG. 4 is a conceptual diagram illustrating fractional pixel positions for a full pixel position.

FIG. 4 is a conceptual diagram illustrating fractional pixel positions for a full pixel position. In particular, FIG. 4 illustrates fractional pixel positions for full pixel (pel) 100. Full pixel 100 corresponds to half-pixel positions 102A-102C (half pels 102), quarter pixel positions 104A-104L (quarter pels 104), and one-eighth-pixel positions 106A-106AV (egth pels 106).

FIG. 4 illustrates eighth pixel positions 106 of a block using dashed outlining to indicate that these positions may be optionally included. That is, if a motion vector has one-eighth-pixel precision, the motion vector may point to any of full pixel position 100, half pixel positions 102, quarter pixel positions 104, or eighth pixel positions 106. However, if the motion vector has one-quarter-pixel precision, the motion vector may point to any of full pixel position 100, half pixel positions 102, or quarter pixel positions 104.

A value for the pixel at full pixel position 100 may be included in a corresponding reference frame. That is, the value for the pixel at full pixel position 100 generally corresponds to the actual value of a pixel in the reference frame, e.g., that is ultimately rendered and displayed when the reference frame is displayed. Values for half pixel positions 102, quarter pixel positions 104, and eighth pixel positions 106 (collectively referred to as fractional pixel positions) may be interpolated using adaptive interpolation filters or fixed interpolation filters, e.g., filters of various numbers of "taps" (coefficients) such as various Wiener filters, bilinear filters, or other filters. In general, the value of a fractional pixel position may be interpolated from one or more neighboring pixels, which correspond to values of neighboring full pixel positions or previously determined fractional pixel positions.

Figure 5:
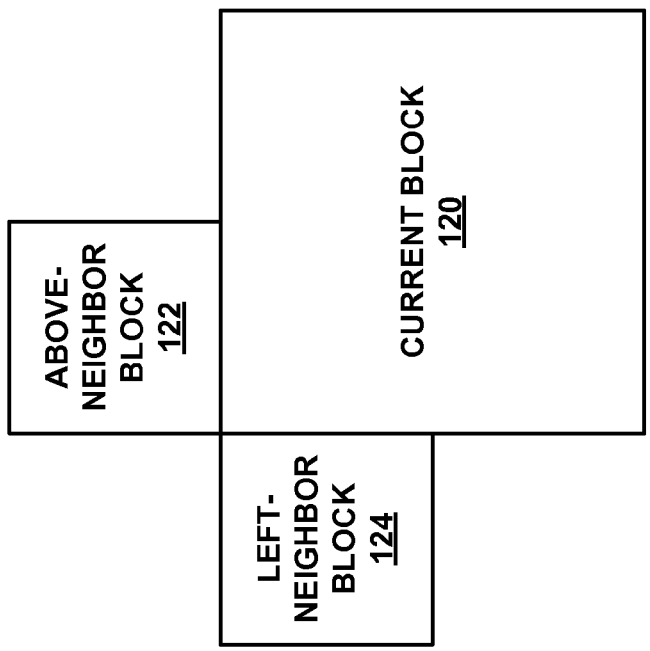
FIG. 5 is a conceptual diagram illustrating blocks that may be used to determine an encoding context for a current block, e.g., a block to be encoded.

FIG. 5 is a conceptual diagram illustrating blocks that may be used to determine an encoding context for current block 120. The example of FIG. 5 illustrates current block 120 with two neighboring blocks, above-neighbor block 122 and left-neighbor block 124. Current block 120 may correspond to a block that is currently being encoded or decoded, and for which a coding unit (e.g., video encoder 20 or video decoder 30) is determining an encoding context.

The upper-left corner of current block 120, the lower-left corner of above-neighbor block 122, and the upper-right corner of left-neighbor block 124 each touch, in this example. Many coding units are configured to process video blocks from left-to-right and top-to-bottom for a frame. Accordingly, an encoding context for current block 120 may be based on blocks above and to the left of current block 120, such as above-neighbor block 122 and left-neighbor block 124.

Current block 120 may correspond to a macroblock or a partition of a macroblock. Above-neighbor block 122 and left-neighbor block 124 may each correspond to distinct macroblocks. That is, current block 120 may correspond to a portion of a first macroblock, above-neighbor block 122 may correspond to a portion of a second, different macroblock, and left-neighbor block 124 may correspond to a portion of a third, different macroblock. In some examples, current block 120 may correspond to a partition of a current macroblock, above-neighbor block 122 may correspond to a 4×4 pixel lower-left portion of a macroblock above the current macroblock, and left-neighbor block 124 may correspond to a 4×4 upper-right portion of a macroblock to the left of the current macroblock. In some examples, current block 120, above-neighbor block 122, and left-neighbor block 124 may be portions of the same or different macroblocks.

To determine an encoding context for current block 120, a coding unit may analyze whether motion vectors for above-neighbor block 122 and left-neighbor block 124 have one-eighth-pixel precision or one-quarter-pixel precision. The motion vector for above-neighbor block 122 may be for a larger block of video data including above-neighbor block 122. For example, above-neighbor block 122 may be defined as a 4×4 pixel region, which may be included within an 8×8 pixel partition having a single motion vector. Similarly, the motion vector for left-neighbor block 124 may be for a larger block of video data including left-neighbor block 124.

A first encoding context for current block 120 may correspond to when the motion vector for above-neighbor block 122 has one-quarter-pixel precision and when the motion vector for left-neighbor block 124 also has one-quarter-pixel precision. A second encoding context for current block 120 may correspond to when the motion vector for above-neighbor block 122 has one-quarter-pixel precision and when the motion vector for left-neighbor block 124 has one-eighth-pixel precision. A third encoding context for current block 120 may correspond to when the motion vector for above-neighbor block 122 has one-eighth-pixel precision and when the motion vector for left-neighbor block 124 also has one-quarter-pixel precision. A fourth encoding context for current block 120 may correspond to when the motion vector for above-neighbor block 122 has one-eighth-pixel precision and when the motion vector for left-neighbor block 124 also has one-eighth-pixel precision.

Table 1 below summarizes the example encoding contexts described above. Table 1 also illustrates an example relationship between an encoding context and a set of variable length codes to use when encoding a reference frame index value for a motion vector for current block 120 in the corresponding encoding context.

TABLE 1

| Context | Precision of MV for above-block | Precision of MV for left-block | VLC Codeword Set |
| --- | --- | --- | --- |
| Context 1 | Quarter-pixel | Quarter-pixel | Set 1 |
| Context 2 | Quarter-pixel | Eighth-pixel | Set 2 |
| Context 3 | Eighth-pixel | Quarter-pixel | Set 3 |
| Context 4 | Eighth-pixel | Eighth-pixel | Set 4 |

Tables 2-5 provide example sets of codewords for an example reference frame index value. These example sets of codewords are provided for the purpose of demonstration and explanation. In general, the sets of codewords may be generated by executing a CAVLC algorithm for each of the potential contexts, based on, e.g., data indicative of how likely a particular reference frame index value is to occur, as well as how likely one-eighth-pixel or quarter pixel precision motion vectors are to be used in the context when the motion vectors refer to the reference frame corresponding to the reference frame index value in the corresponding context. The examples of Tables 2-5 provide example codewords for the same reference frame index value in different contexts, and for both one-quarter-pixel and one-eighth-pixel precision motion vectors.

Table 2 illustrates codewords for the first example context, where motion vectors for both above-neighbor block 122 and left-neighbor block 124 have one-quarter-pixel precision. It may be determined, e.g., through empirical testing, that when both of these motion vectors have one-quarter-pixel precision, that the motion vector for current block 120 may likely also have one-quarter-pixel precision. Accordingly, the codeword for the reference frame index value that also indicates that the motion vector has one-quarter-pixel precision in this context may be relatively shorter than the codeword for the reference value that also indicates that the motion vector has one-eighth-pixel precision. In other examples, empirical testing may indicate that, on the contrary, the motion vector for current block 120 may likely have one-eighth-pixel precision instead for this context, or that the probabilities of quarter- or one-eighth-pixel precision in this context may be approximately the same. In any case, by having a shorter codeword for the more-likely precision for a motion vector, relative to the codeword for the less-likely precision in the context for the same reference frame, a bit savings may be achieved.

TABLE 2

| Reference Frame Index | MV Precision | Codeword |
| --- | --- | --- |
| 2 | Quarter-pixel | 011010 |
| 2 | Eighth-pixel | 01011011101 |
| ... | ... | ... |

Table 3 illustrates codewords for the second example context, where the motion vector for above-neighbor block 122 has one-quarter-pixel precision and where the motion vector for left-neighbor block 124 has one-eighth-pixel precision. It may be determined, e.g., through empirical testing, that when these motion vectors have these precisions, that the motion vector for current block 120 may likely have one-eighth-pixel precision. Accordingly, the codeword for the reference frame index value that also indicates that the motion vector has one-quarter-pixel precision in this context may be relatively longer than the codeword for the reference value that also indicates that the motion vector has one-eighth-pixel precision. In other examples, empirical testing may indicate that, on the contrary, the motion vector for current block 120 may likely have one-quarter-pixel precision instead for this context, or that the probabilities of quarter- or one-eighth-pixel precision in this context may be approximately the same.

TABLE 3

| Reference Frame Index | MV Precision | Codeword |
| --- | --- | --- |
| 2 | Quarter-pixel | 01010011 |
| 2 | Eighth-pixel | 011001 |
| ... | ... | ... |

Table 4 illustrates codewords for the third example context, where the motion vector for above-neighbor block 122 has one-eighth-pixel precision and where the motion vector for left-neighbor block 124 has one-quarter-pixel precision. It may be determined, e.g., through empirical testing, that when these motion vectors have these precisions, that the motion vector for current block 120 may likely have one-quarter-pixel precision. Accordingly, the codeword for the reference frame index value that also indicates that the motion vector has one-quarter-pixel precision in this context may be relatively shorter than the codeword for the reference value that also indicates that the motion vector has one-eighth-pixel precision. In other examples, empirical testing may indicate that, on the contrary, the motion vector for current block 120 may likely have one-eighth-pixel precision instead for this context, or that the probabilities of quarter- or one-eighth-pixel precision in this context may be approximately the same.

TABLE 4

| Reference Frame Index | MV Precision | Codeword |
| --- | --- | --- |
| 2 | Quarter-pixel | 011011 |
| 2 | Eighth-pixel | 010110010 |
| ... | ... | ... |

Table 5 illustrates codewords for the fourth example context, where the motion vectors for both above-neighbor block 122 and left-neighbor block 124 have one-eighth-pixel precision. It may be determined, e.g., through empirical testing, that when these motion vectors both have one-eighth-pixel precision, that the motion vector for current block 120 may likely have one-eighth-pixel precision. Accordingly, the codeword for the reference frame index value that also indicates that the motion vector has one-quarter-pixel precision in this context may be relatively longer than the codeword for the reference value that also indicates that the motion vector has one-eighth-pixel precision. In other examples, empirical testing may indicate that, on the contrary, the motion vector for current block 120 may likely have one-quarter-pixel precision instead for this context, or that the probabilities of quarter- or one-eighth-pixel precision in this context may be approximately the same.

TABLE 5

| Reference Frame Index | MV Precision | Codeword |
|---|---|---|
| 2 | Quarter-pixel | 01101011101001 |
| 2 | Eighth-pixel | 010110 |
| ... | ... | ... |

As noted above, the codewords in tables 2-5 are provided merely for purposes of example. In general, codewords for these various contexts may be generated by executing a CAVLC algorithm using statistics gathered via empirical testing. The statistics may relate to the likelihood of a particular reference frame being identified by a motion vector in a particular context, as well the likelihood that the motion vector that identifies the reference frame has one-eighth-pixel precision or quarter pixel precision, in the corresponding context. Executing the CAVLC algorithm may produce codewords for each potential reference frame index value, paired with one-quarter-pixel precision for a motion vector and one-eighth-pixel precision for a motion vector. By encoding motion vectors using a particular encoding context, the techniques of this disclosure may achieve a coding bit savings, in that more likely precision of a motion vector referring to a more likely reference frame may have a shorter codeword in a particular context than less likely precision for a motion vector referring to a less likely reference frame.

Figure 6:
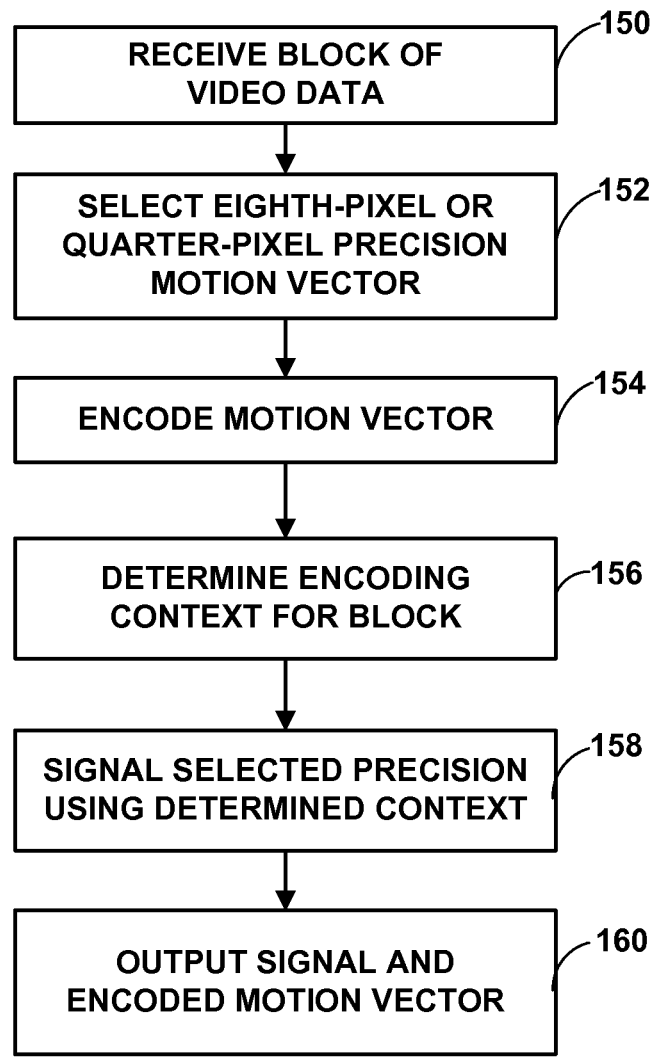
FIG. 6 is a flowchart illustrating an example method for encoding a block of video data using either one-eighth-pixel precision motion vectors or one-quarter-pixel precision motion vectors, and for signaling the selection of the precision for a decoder.

FIG. 6 is a flowchart illustrating an example method for encoding a block of video data using either one-eighth-pixel precision motion vectors or one-quarter-pixel precision motion vectors, and for signaling the selection of the precision. For purposes of explanation, the method of FIG. 6 is described with respect to video encoder 20 of FIG. 2. However, it should be understood that other units, e.g., processors, video encoders, video CODECs, control units, or other hardware, software, or firmware implementations, may also be configured to perform the method of FIG. 6.

Initially, video encoder 20 may receive a block of video data to be encoded (150). In the example of FIG. 6, the block may correspond to a block of an inter-mode encoded frame or picture (e.g., a P- or B-frame). Mode select unit 40 may receive the block and forward the block to motion estimation unit 42 to perform a motion search for the block relative to a reference frame stored in reference frame store 64. Motion estimation unit 42 may execute a motion search algorithm to calculate a motion vector for the block.

Motion estimation unit 42 may further determine whether to use a motion vector having one-eighth-pixel precision or a motion vector having one-quarter-pixel precision to encode the block (152). In some examples, motion estimation unit 42 may calculate a first motion vector for the block having one-quarter-pixel precision and a second motion vector for the block having one-eighth-pixel precision, e.g., in two encoding passes. The first motion vector may reference a first prediction block and the second motion vector may reference a second prediction block. The two prediction blocks need not necessarily come from the same reference frame.

Motion compensation unit 44 may calculate error values for the first prediction block and the second prediction block. For example, motion compensation unit 44 may calculate a difference between the first prediction block and the block to be encoded, and a difference between the second prediction block and the block to be encoded. Motion compensation unit 44 may calculate rate-distortion values during a motion estimation process that calculates motion vectors for the first and second prediction blocks. Resolution selection unit 48 may compare the rate-distortion values for the motion vectors for the first and second prediction blocks and determine one-eighth-pixel which precision provides a lower rate-distortion. In other examples, resolution selection unit 48 may determine whether to encode the block using a motion vector having one-eighth-pixel precision or a motion vector having quarter pixel precision in other ways, as may be determined by those of skill in the art.

Motion estimation unit 42 may then encode the selected motion vector (154). For example, motion estimation unit 42 may select a motion predictor for the block to be encoded. The motion predictor may correspond to the median of motion vectors for neighboring blocks of the block to be encoded. Motion estimation unit 42 may encode the motion vector by calculating a motion vector difference value, e.g., the difference between the selected motion vector and the motion predictor. Motion estimation unit 42 may further, in some examples, quantize the motion predictor to the resolution of the selected motion vector before calculating the motion vector difference value. In some examples, motion estimation unit 42 may ensure that motion vector difference values are always calculated in a common resolution, e.g., always in one-eighth-pixel precision or always in one-quarter-pixel precision. Video encoder 20 may further generate signaling information to indicate how the motion vector difference value was calculated (e.g., whether the motion predictor was quantized to the same precision as the motion vector, or whether the motion vector difference value was calculated in a global precision).

In addition to calculating the motion vector difference value to encode the motion vector, video encoder 20 may further signal the precision (e.g., one-eighth-pixel or one-quarter-pixel) for the encoded motion vector. In the example of FIG. 6, entropy coding unit 56 may include this signal along with a reference frame index value that identifies a reference frame including the prediction block identified by the motion vector. In this example, entropy coding unit 56 may determine an encoding context for the encoded block based on whether neighboring blocks were encoded using motion vectors having one-eighth-pixel precision or quarter pixel precision (156).

Entropy coding unit 56 may then determine a codeword for the reference frame index value and the precision for the motion vector from a set of codewords corresponding to the determined context to signal the selected precision for the motion vector, and thus may signal the selected precision using the determined context (158). Entropy coding unit 56 may also select a codeword for the motion vector difference value to entropy-encode the motion vector difference value. Video encoder 20 may then output the encoded motion vector and the signal, e.g., the codeword for the motion vector difference and the codeword for the reference frame index value and selected precision (160).

The method of FIG. 6 may be summarized as including encoding a block of video data using a one-eighth-pixel precision motion vector when use of the one-eighth-pixel precision motion vector is determined to be preferable for the block over a one-quarter-pixel precision motion vector, generating a signal value indicative of the use of the one-eighth-pixel precision motion vector for the block, and outputting the encoded block and the signal value.

Figure 7:
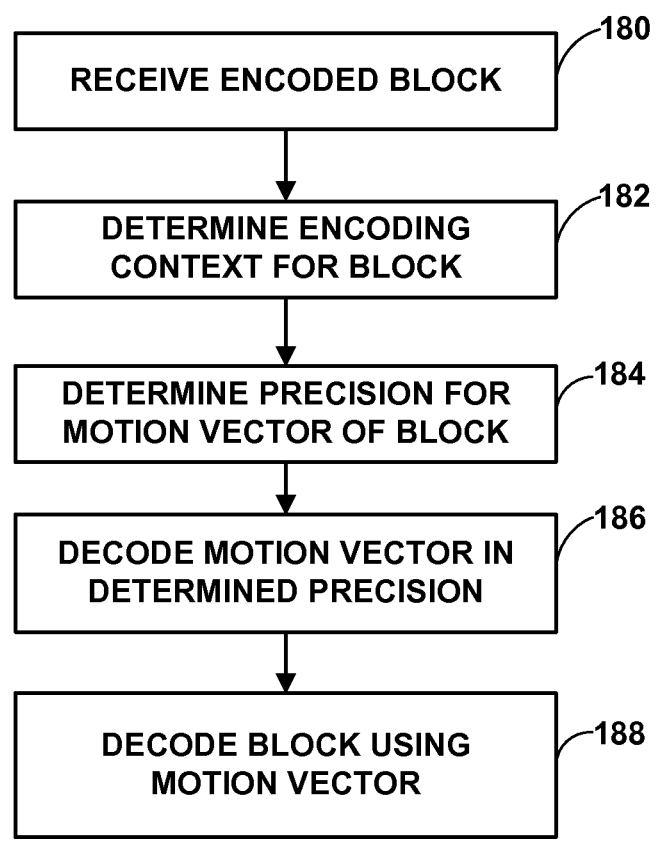
FIG. 7 is a flowchart illustrating an example method for decoding an encoded block using a signal value indicative of a precision for a motion vector for the encoded block.

FIG. 7 is a flowchart illustrating an example method for decoding an encoded block using a signal value indicative of a precision for a motion vector for the encoded block. For purposes of explanation, the method of FIG. 7 is described with respect to video decoder 30 of FIG. 3. However, it should be understood that other units, e.g., processors, video decoders, video CODECs, control units, or other hardware, software, or firmware implementations, may also be configured to perform the method of FIG. 7.

Initially, entropy decoding unit 70 may receive an encoded block of video data (180). For example, a client device including video decoder 30 may receive a stream of encoded video data over a network or broadcast transmission, or may extract video data from a storage medium such as a DVD, Blu-Ray disc, hard drive, flash drive, or other storage medium. The encoded block may include a motion vector difference value, a codeword for a reference frame index value and an indication of a precision for the motion vector encoded using the motion vector difference value, and a residual value.

Entropy decoding unit 70 may receive an indication of an encoding context for the encoded block, e.g., from motion compensation unit 72. Motion compensation unit 72 may determine an encoding context for the block (182), e.g., based on whether neighboring blocks were encoded using one-eighth-pixel or one-quarter-pixel precision motion vectors. Entropy decoding unit 70 may then determine a reference frame index value and a precision for the encoded motion vector by identifying the codeword in a set of codewords corresponding to the encoding context for the block (184). Entropy decoding unit 70 may provide the reference frame index value and precision for the motion vector, the motion vector difference value, and a residual value to motion compensation unit 72 and intra prediction unit 74.

Motion compensation unit 72 may decode a motion vector for the block using the motion vector difference value in the determined precision (186). For example, motion compensation unit 72 may determine a motion predictor for the motion vector as a median of the motion vectors of neighboring blocks that have already been decoded. In some examples, motion compensation unit 72 may quantize the motion predictor to the determined precision for the motion vector to be decoded. In some examples, motion compensation unit 72 may be configured to use the same precision when decoding any motion vector. In any case, motion compensation unit 72 may decode the motion vector by calculating the sum of the motion vector difference value and the selected motion predictor. This sum may produce a motion vector having the determined precision, e.g., either one-eighth-pixel precision or one-quarter-pixel precision.

Motion compensation unit 72 may further decode the block using the decoded motion vector (188). For example, motion compensation unit 72 may refer to a prediction block in a reference frame of reference frame store 82 identified by the decoded motion vector and reference frame index value. In some cases, motion compensation unit 72 may interpolate values for fractional pixel positions of the reference frame, e.g., using adaptive interpolation filters or fixed interpolation filters. Moreover, motion compensation unit 72 may add the received residual value to the prediction block to produce the decoded block. After decoding all blocks of a picture, video decoder 30 may pass the decoded picture to a video output, which may display the decoded picture. Video decoder 30 may also store the decoded picture in reference frame store 82, to be used as a reference frame for encoded blocks of later-received encoded pictures.

The method of FIG. 7 may be summarized as including receiving an encoded block of video data and a signal value indicating that the encoded block of video data was encoded using a one-eighth-pixel precision motion vector, analyzing the signal value to determine that the block of video data is encoded using the one-eighth-pixel precision motion vector, and decoding the block of video data using the one-eighth-pixel precision motion vector based on the signal value.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of encoding video data, the method comprising:
   encoding a block of video data relative to a portion of a reference frame using a first precision motion vector when use of the first precision motion vector is determined to be preferable for the block over the use of a second precision motion vector;
   determining an encoding context for the block based, at least in part, on whether neighboring blocks to the block are encoded using motion vectors having the same sub-integer precision of the first precision motion vector or the second precision motion vector;
   generating, based on selecting a variable length code, a signal value indicative of both the use of the first precision motion vector for the block and a reference frame index value that identifies the reference frame, the variable length code being selected from a set of codes corresponding to the determined encoding context, a length of the selected code being shorter than a length of another code in the set of codes that is indicative of the use of the second precision motion vector with respect to the reference frame, and the use of the first precision motion vector being determined to be preferable for the block based, at least in part, on whether the reference frame is a latest reference frame from a list of reference frames as indicated by the reference frame index value; and
   outputting the encoded block and the signal value.

2. The method of claim 1, wherein generating the signal value comprises setting a value for a flag associated with the block to indicate the use of the first precision motion vector.

3. The method of claim 1, wherein the block comprises a partition of a macroblock, and wherein generating the signal value comprises setting a value for a flag associated with the macroblock to indicate the use of the first precision motion vector, the method further comprising encoding each of the partitions of the macroblock using a respective motion vector having the same sub-integer pixel precision as the first precision motion vector when the flag indicates the use of the first precision motion vector for the block.

4. The method of claim 1, wherein encoding the block comprises:
   calculating the first precision motion vector for the block; and
   calculating a motion vector difference value comprising a difference between the first precision motion vector and a motion predictor for the block.

5. The method of claim 4, wherein calculating the motion vector difference value comprises:
   quantizing the motion predictor to have the same sub-integer pixel precision as the first precision motion vector; and
   calculating the difference between the first precision motion vector for the block and the quantized motion predictor.

6. An apparatus for encoding video data, the apparatus comprising:
   a video encoder configured to:
      encode a block of video data relative to a portion of a reference frame using a first precision motion vector when use of the first precision motion vector is determined to be preferable for the block over the use of a second precision motion vector,
      determine an encoding context for the block based, at least in part, on whether neighboring blocks to the block are encoded using motion vectors having the same sub-integer pixel precision as the first precision motion vector or the second precision motion vector,
      generate, based on selecting a variable length code, a signal value indicative of both the use of the first precision motion vector for the block and a reference frame index value that identifies the reference frame, the variable length code being selected from a set of codes corresponding to the determined encoded context, a length of the selected code being shorter that a length of another code in the set of codes that is indicative of the use of the second precision motion vector with respect to the reference frame, and the use of the first precision motion vector being determined to be preferable for the block based, at least in part, on whether the reference frame is a latest reference frame from a list of reference frames as indicated by the reference frame index value; and
   a transmitter configured to output the encoded block and the signal value.

7. The apparatus of claim 6, wherein to generate the signal value, the video encoder is configured to set a value for a flag associated with the block to indicate the use of the first precision motion vector.

8. The apparatus of claim 6, wherein the block comprises a partition of a macroblock, and wherein to generate the signal value, the video encoder is configured to set a value for a flag associated with the macroblock to indicate the use of the first precision motion vector, and wherein the video encoder is configured to encode each of the partitions of the macroblock using a respective motion vector having the same sub-integer pixel precision as the first precision motion vector when the flag indicates the use of the first precision motion vector for the block.

9. An apparatus for encoding video data, the apparatus comprising:
   means for encoding a block of video data relative to a portion of a reference frame using a first precision motion vector when use of the first precision motion vector is determined to be preferable for the block over the use of a second precision motion vector;
   means for determining an encoding context for the block based on whether neighboring blocks to the block are encoded using motion vectors having the same sub-integer pixel precision as the first precision motion vector or the second precision motion vector;
   means for generating, based on selecting a variable length code, a signal value indicative of both the use of the first precision motion vector for the block and a reference frame index value that identifies the reference frame, the variable length code being selected from a set of codes corresponding to the determined encoded context, and the use of the first precision motion vector being determined to be preferable for the block based, at least in part, on whether the reference frame is a latest reference frame from a list of reference frames as indicated by the reference frame index value; and means for outputting the encoded block and the signal value.

10. The apparatus of claim 9, wherein the block comprises a partition of a macroblock, wherein the means for generating the signal value comprises means for setting a value for a flag associated with the macroblock to indicate the use of the first precision motion vector, and wherein the means for encoding the block further comprises means for encoding each of the partitions of the macroblock using a respective motion vector having the same sub-integer pixel precision as the first precision motion vector when the flag indicates the use of the first precision motion vector for the block.

11. The apparatus of claim 9, wherein the means for encoding the block comprises:

means for calculating the first precision motion vector for the block; and means for calculating a motion vector difference value comprising a difference between the first precision motion vector and a motion predictor for the block.

12. The apparatus of claim 11, wherein the means for calculating the motion vector difference value comprises:

means for quantizing the motion predictor to have the same sub-integer pixel precision as the first precision motion vector; and means for calculating the difference between the first precision motion vector for the block and the quantized motion predictor.

13. A non-transitory computer-readable storage medium comprising instructions that, when executed, cause a processor to:

encode a block of video data relative to a portion of a reference frame using a first precision motion vector when use of the first precision motion vector is determined to be preferable for the block over the use of a second precision motion vector;

determine an encoding context for the block based on whether neighboring blocks to the block are encoded using motion vectors having the same sub-integer pixel precision as the first precision motion vector or the second precision motion vector;

generate, based on selecting a variable length code, a signal value indicative of the use of both the first precision motion vector for the block and a reference frame index value that identifies the reference frame, the variable length code being selected from a set of codes corresponding to the determined encoded context, and the use of the first precision motion vector being determined to be preferable for the block based, at least in part, on whether the reference frame is a latest reference frame from a list of reference frames as indicated by the reference frame index value; and output the encoded block and the signal value.

14. The non-transitory computer-readable storage medium of claim 13, wherein the block comprises a partition of a macroblock, and wherein the instructions to generate the signal value comprises instructions to set a value for a flag associated with the macroblock to indicate the use of the first precision motion vector, the computer-readable storage medium further comprising instructions to encode each of the partitions of the macroblock using a respective motion vector having the same sub-integer pixel precision as the first precision motion vector when the flag indicates the use of the first precision motion vector for the block.

15. The non-transitory computer-readable storage medium of claim 13, wherein the instructions to encode the block comprise instructions to:

calculate the first precision motion vector for the block; and calculate a motion vector difference value comprising a difference between the first precision motion vector and a motion predictor for the block.

16. The non-transitory computer-readable storage medium of claim 15, wherein the instructions to calculate the motion vector difference value comprise instructions to:

quantize the motion predictor to have the same sub-integer pixel precision as the first precision motion vector; and calculate the difference between the first precision motion vector for the block and the quantized motion predictor.

17. A method of decoding video data, the method comprising:

receiving an encoded block of video data encoded relative to a portion of a reference frame and a signal value indicating both a reference frame index value and that the encoded block was encoded using a first precision motion vector, the use of the first precision motion vector being determined to be preferable to encode the block over the use of a second precision motion vector based, at least in part, on whether the reference frame used to encode the block is a latest reference frame from a list of reference frames as indicated by the reference frame index value;

determining an encoding context for the block based on whether neighboring blocks to the block were encoded using motion vectors having the same sub-integer pixel precision as the first precision motion vector or the second precision motion vector;

identifying the reference frame at least in part by identifying the reference frame index value based on a set of codes corresponding to the determined encoding context;

analyzing the signal value at least in part by analyzing a variable length code indicative of the reference frame index value and the use of the first precision motion vector to encode the block, the signal value being analyzed to determine that the encoded block of video data was encoded using the first precision motion vector; and decoding the encoded block using the first precision motion vector based on the signal value, wherein the encoded block comprises a motion vector difference value, and wherein decoding the block comprises:

determining a motion predictor for the block; and calculating the sum of the motion predictor and the motion vector difference value to calculate the first precision motion vector.

18. The method of claim 17, wherein the block comprises a partition of a macroblock, and wherein analyzing the signal value comprises analyzing a value for a flag associated with the macroblock that indicates the use of the first precision motion vector, the method further comprising decoding each of the partitions of the macroblock using a respective received motion vector having the same sub-integer pixel precision as the first precision motion vector.

19. An apparatus for decoding video data, the apparatus comprising:

an input interface configured to receive an encoded block of video data encoded relative to a portion of a reference frame and a signal value indicating both a reference frame index value and that the encoded block was encoded using a first precision motion vector, wherein the use of the first precision motion vector is determined to be preferable to encode the block over the use of a second precision motion vector based, at least in part, on whether the reference frame used to encode the block is a latest reference frame from a list of reference frames as indicated by the reference frame index value; and a video decoder configured to:
- determine an encoding context for the block based on whether neighboring blocks to the block were encoded using motion vectors having the same sub-integer pixel precision as the first precision motion vector or the second precision motion vector, and wherein to identify the reference frame,
- identify the reference frame at least in part by identifying the reference frame index value based on a set of codes corresponding to the determined encoding context,
- analyze the signal value at least in part by analyzing a variable length code indicative of the reference frame index value and the use of the first precision motion vector to encode the block to determine that the block of video data was encoded using the first precision motion vector, and
- decode the encoded block using the first precision motion vector based on the signal value.

20. The apparatus of claim 19, wherein the block comprises a partition of a macroblock, and wherein to analyze the signal value, the video decoder is configured to analyze a value for a flag associated with the macroblock that indicates the use of the first precision motion vector, and wherein the video decoder is configured to decode each of the partitions of the macroblock using a respective received motion vector having the same sub-integer pixel precision as the first precision motion vector.

21. An apparatus for decoding video data, the apparatus comprising:
- means for receiving an encoded block of video data encoded relative to a portion of a reference frame and a signal value indicating both a reference frame index value and that the encoded block of video data was encoded using a first precision motion vector, the use of the first precision motion vector being determined to be preferable to encode the block of video data over the use of a second precision motion vector based, at least in part, on whether the reference frame used to encode the block is a latest reference frame from a list of reference frames as indicated by the reference frame index value;
- means for determining an encoding context for the block based on whether neighboring blocks to the block were encoded using motion vectors having the same sub-integer pixel precision as the first precision motion vector or the second precision motion vector;
- means for identifying the reference frame at least in part by identifying the reference frame index value based on a set of codes corresponding to the determined encoding context;
- means for analyzing the signal value at least in part by analyzing a variable length code indicative of the reference frame index value and the use of the first precision motion vector to encode the block, the signal value being analyzed to determine that the block of video data was encoded using the first precision motion vector; and
- means for decoding the encoded block using the first precision motion vector based on the signal value, wherein the encoded block comprises a motion vector difference value, and wherein the means for decoding the block comprises:
- means for determining a motion predictor for the block; and
- means for calculating the sum of the motion predictor and the motion vector difference value to calculate the first precision motion vector.

22. The apparatus of claim 21, wherein the block comprises a partition of a macroblock, wherein the means for analyzing the signal value comprises means for analyzing a value for a flag associated with the macroblock that indicates the use of the first precision motion vector, and wherein the means for decoding the block of video data further comprises means for decoding each of the partitions of the macroblock using a respective received motion vector having the same sub-integer pixel precision as the first precision motion vector.

23. A non-transitory computer-readable storage medium comprising instructions that, when executed, cause a processor to:
- receive an encoded block of video data encoded relative to a portion of a reference frame and a signal value indicating both a reference frame index value and that the encoded block of video data was encoded using a first precision motion vector, the use of the first precision motion vector being determined to be preferable to encode the block over the use of a second precision motion vector based, at least in part, on whether the reference frame used to encode the block is a latest reference frame from a list of reference frames as indicated by the reference frame index value;
- determine an encoding context for the block based on whether neighboring blocks to the block were encoded using motion vectors having the same sub-integer pixel precision as the first precision motion vector or the second precision motion vector;
- identify the reference frame at least in part by identifying the reference frame index value based on a set of codes corresponding to the determined encoded context;
- analyze the signal value at least in part by analyzing a variable length code indicative of the reference frame index value and the use of the first precision motion vector to encode the block, the signal value being analyzed to determine that the block of video data was encoded using the first precision motion vector; and
- decode the encoded block using the first precision motion vector based on the signal value.

24. The non-transitory computer-readable storage medium of claim 23, wherein the block comprises a partition of a macroblock, wherein the instructions to analyze the signal value comprise instructions to analyze a value for a flag associated with the macroblock that indicates the use of the first precision motion vector, and wherein the instructions to decode the block of video data comprise instructions to decode each of the partitions of the macroblock using a respective received motion vector having the same sub-integer pixel precision as the first precision motion vector.

25. The method of claim 1, further comprising listing a plurality of reference frame index values, including the reference frame index value, in a reference frame index associated with the list of reference frames, wherein each of the plurality of reference frame index values identifies a disparate reference frame.

26. The method of claim 1, further comprising:
performing a first encoding pass using the sub-integer pixel precision of the first precision motion vector;
performing a second encoding pass using the sub-integer pixel precision of the second precision motion vector;
calculating a first cost for the first encoding pass;
calculating a second cost for the second encoding pass; and
selecting the use of the first precision motion vector to be preferable for the block over the use of the second precision motion vector if the first cost is lower than the second cost,
wherein each of the first cost and the second cost is calculated as a weighted combination of error and bit-rate.

27. The method of claim 1, wherein determining that use of the first precision motion vector is preferable for the block comprises performing a rate-distortion optimization during a motion vector search.

28. The method of claim 1, wherein the first precision motion vector is a one-eighth-pixel precision motion vector and the second precision motion vector is a one-quarter-pixel precision motion vector.

29. The method of claim 1, wherein generating the signal value comprises combining the reference frame index value with a first signal value indicative of the user of the first precision motion vector.

30. The method of claim 1, wherein the use of the first precision motion vector is indicated by a statistical likelihood that a precision motion vector corresponding to the reference frame is the first precision motion vector.

31. The method of claim 30, wherein the signal value comprises the reference frame index value and a value representing the statistical likelihood.

32. The method of claim 1, wherein the first precision motion vector is determined for the reference frame.

33. The method of claim 1, further comprising selecting whether use of the first precision motion vector or use of the second precision motion vector is preferable for the block only when the reference frame is the latest reference frame from the list of reference frames.

34. The method of claim 33, wherein when the reference frame is not the latest reference frame from the list of reference frames, the selecting is not performed and the block is encoded using the second precision motion vector.

35. The method of claim 17, the method being executable on a wireless communication device, wherein the device comprises:
a memory configured to store video data;
a processor configured to execute instructions to process the video data in the memory; and
a receiver configured to receive the encoded block and the signal value.

36. The method of claim 35, wherein the wireless communication device is a cellular telephone, and the encoded block and the signal value are received by the receiver and modulated according to a cellular communication standard.

37. The method of claim 19, the method being executable on a wireless communication device, wherein the device comprises:
a memory configured to store video data;
a processor configured to execute instructions to process the video data in the memory; and
a receiver configured to receive the encoded block and the signal value, and to provide the encoded block and the signal value for reception by the input interface.

38. The method of claim 37, wherein the wireless communication device is a cellular telephone, and the encoded block and the signal value are received by the receiver and modulated according to a cellular communication standard.

* * * * *